US008385496B1

(12) United States Patent
Chan et al.

(10) Patent No.: US 8,385,496 B1
(45) Date of Patent: Feb. 26, 2013

(54) APPARATUS AND METHODS OF RECEIVER OFFSET CALIBRATION

(75) Inventors: Allen Chan, San Jose, CA (US); Wilson Wong, San Francisco, CA (US); Sergey Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 344 days.

(21) Appl. No.: 12/909,744

(22) Filed: Oct. 21, 2010

(51) Int. Cl.
*H04L 7/00* (2006.01)
*H04L 25/00* (2006.01)
*H04L 25/40* (2006.01)

(52) U.S. Cl. ............ 375/371; 375/226; 327/307; 330/9
(58) Field of Classification Search .......... 375/224, 375/226, 319, 344–345, 371, 377; 327/307; 330/9, 259; 326/26, 82
See application file for complete search history.

(56) References Cited

U.S. PATENT DOCUMENTS

| 5,351,000 | A * | 9/1994 | Farwell ................. 324/76.77 |
| 7,123,046 | B2 * | 10/2006 | Keeth .......................... 326/26 |
| 7,482,841 | B1 | 1/2009 | Nguyen et al. |
| 7,521,956 | B2 * | 4/2009 | Keeth .......................... 326/26 |
| 2010/0135378 | A1 | 6/2010 | Lin et al. |
| 2012/0274427 | A1 * | 11/2012 | Dubash et al. ................ 334/8 |

OTHER PUBLICATIONS

Simar Maangat, et al. "Receiver Offset Cancellation in 90-nm PLD Integrated SERDES", Nov. 2007, 4 sheets, Altera Corporation, San Jose, California.
Tina Tran, et al. "Offset Cancellation in Receiver Path in 45-nm 6.5-Gbps Transceiver FPGAs", Jan. 2010, 9 sheets, DesignCon 2010, Altera Corporation, San Jose, California.
Simar Maangat, et al. "Using Programmable Logic for Receiver Offset and Yield Enhancement", Feb. 2008, 12 sheets, DesignCon 2008, Altera Corporation, San Jose, California.

* cited by examiner

*Primary Examiner* — Jean B Corrielus
(74) *Attorney, Agent, or Firm* — Okamoto & Benedicto LLP (57) ABSTRACT

One embodiment relates to a method of offset cancellation for a receiver in an integrated circuit. The receiver is set to a phase-detector offset-cancellation mode so as to determine offset cancellation settings for the phase detector. The offset cancellation settings are applied to the phase detector. The receiver is then set to a receiver-driver offset-cancellation mode so as to determine an offset cancellation setting for the receiver driver. This offset cancellation setting is applied to the receiver driver. Another embodiment relates to an integrated circuit configured to perform receiver offset cancellation. The integrated circuit including a receiver driver configured to receive a differential input signal, a phase detector including a plurality of latches, a calibration controller, a voltage source, and first and second pairs of switches. Other embodiments, aspects, and features are also disclosed.

20 Claims, 8 Drawing Sheets

APPARATUS AND METHODS OF RECEIVER OFFSET CALIBRATION

BACKGROUND

1. Technical Field

The present invention relates generally to transceivers and integrated circuits. More particularly, the present invention relates to the offset calibration for a receiver in an integrated circuit.

2. Description of the Background Art

As embedded transceivers in integrated circuits advance to smaller and smaller process nodes, the circuitry performance is increasingly subject to effects from silicon process variations. These inherent variations may reduce yields by degrading the circuit performance to the point where required operating conditions are violated. Mechanisms may be designed into these critical circuits so as to optimize them despite the silicon variations. However, the current calibration methods are complex and result in longer convergence times.

It is highly desirable to improve the operation of embedded transceivers in integrated circuits.

SUMMARY

One embodiment relates to a method of offset cancellation for a receiver in an integrated circuit. The receiver is set to a phase-detector offset-cancellation mode so as to determine offset cancellation settings for the phase detector. The offset cancellation settings are applied to the phase detector. The receiver is then set to a receiver-driver offset-cancellation mode so as to determine an offset cancellation setting for the receiver driver. This offset cancellation setting is applied to the receiver driver.

Another embodiment relates to an integrated circuit configured to perform receiver offset cancellation. The integrated circuit including a receiver driver configured to receive a differential input signal, a phase detector including a plurality of latches, a calibration controller, a voltage source, and first and second pairs of switches. The calibration controller is configured to receive outputs from the latches and to send control signals to the receiver driver and the phase detector. The first pair of switches couples an output of the receiver driver to an input of the phase detector, and the second pair of switches couples the voltage source to the input of the phase detector.

Other embodiments, aspects and features are also disclosed.

DETAILED DESCRIPTION

The disclosed apparatus and methods provide the following benefits and advantages.

First, the disclosed apparatus and methods are remarkably effective in reducing the offset convergence time for the receiver and phase detector path. For example, in one implementation, the disclosed apparatus and methods reduces a total number of combinations of offset settings from approximately 4,096 (2 to the $12^{th}$ power) to 272 (2 to the $4^{th}$ power plus 2 to the $8^{th}$ power). In this case, the convergence time may be decreased by a factor of approximately fifteen.

Second, the disclosed methods and apparatus dramatically reduces the complexity required of the calibration procedure to determine the offset cancellation settings. This is the phase detector offsets and the receiver driver offsets are determined separately.

Third, the disclosed apparatus and methods may be used to simplify the transceiver architecture. The simplification is achievable because the range of offset compensation required to be supported is decreased. This is because the disclosed apparatus and methods isolate the phase detector offsets from the receiver driver offset. This obviates the need to support a higher range of offsets that may occur in conventional architectures where the offsets of the phase detector and receiver driver accumulate before being compensated.

Fourth, the disclosed methods and apparatus may be used to improve transceiver performance. Transceiver performance may be improved because there is a general tradeoff between the magnitude of offset compensation (i.e. the amount of offset "boost") and the bandwidth supportable by the circuit. The greater the offset boost available per channel, the more the bandwidth attenuation. Hence, by reducing the maximum amount of offset required the disclosed methods and apparatus, a higher bandwidth becomes supportable for the receiver path.

Finally, the disclosed methods and apparatus may be used to allow the circuitry to cancel intrinsic device offsets that would otherwise render the circuit non-functional. In other words, a wider range of offsets may be cancelled which leads to an increase in the yield of functioning silicon chips.

Figure 1:
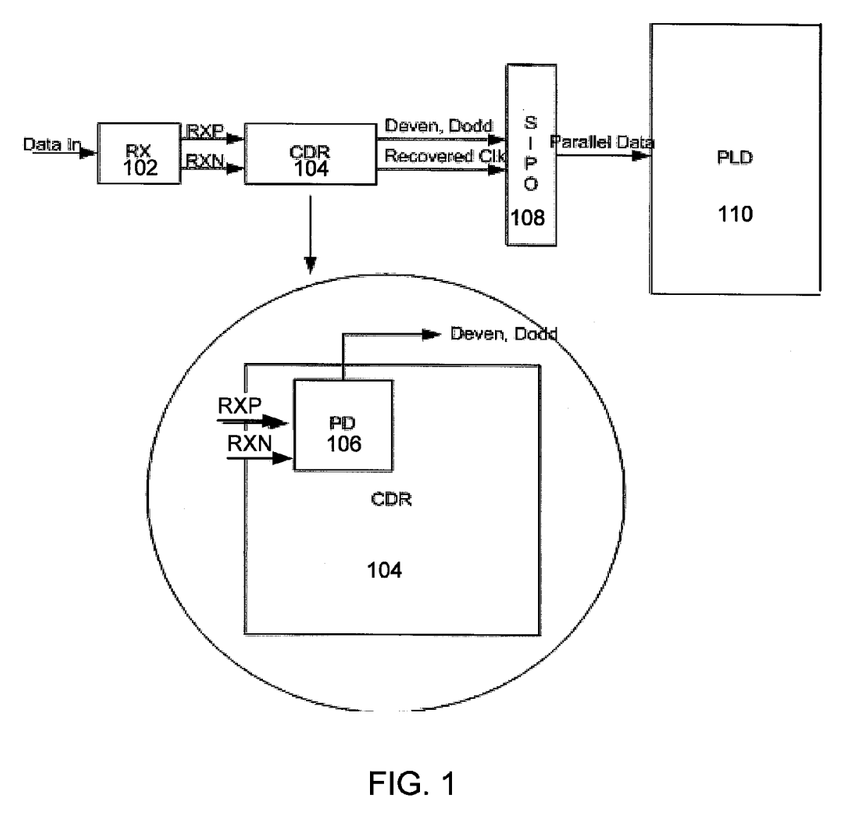
FIG. 1 is a high-level circuit diagram of the receive data path for a transceiver in an integrated circuit.

FIG. 1 is a high-level circuit diagram of the receive data path for a transceiver in an integrated circuit. As shown, the receiver (RX) driver 102 receives a data input signal (Data In). The RX driver 102 may output a differential data signal (RXP and RXN) to the clock data recovery (CDR) circuit 104. As seen in the expanded view of the CDR 104, the CDR 104 includes a phase detector (PD) 106 which outputs even and odd recovered data (Deven and Dodd, respectively). The recovered clock (Recovered Clk) and data (Deven and Dodd) are output from the CDR 104 and sent to the serial-in-parallel-out (SIPO) circuit 108. The SIPO 108 may also be referred to as a deserializer. The SIPO 108 converts the recovered data from serial data to parallel data. Parallel low-speed data is then output by the SIPO 108 and sent to the core 110 of the integrated circuit. For example, the core 110 of the integrated circuit may comprise a programmable logic device (PLD) core.

Figure 2:
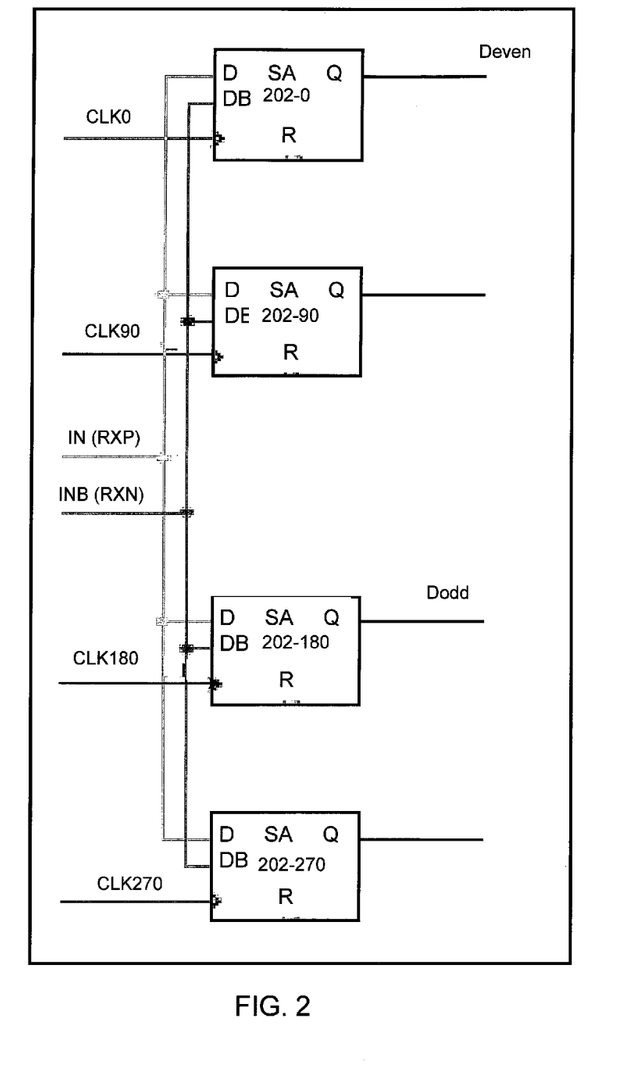
FIG. 2 is a schematic diagram of a first stage of a phase detector.

FIG. 2 is a schematic diagram of a first stage of a phase detector 106. In the illustrated embodiment, the phase detector is implemented as a bang-bang phase detector (BBPD). The BBPD is a half-rate non-linear circuit. The BBPD is half rate in that the clock runs at half the rate of the data. The BBPD is nonlinear in that its output is not linearly related to the phase difference between the clock and the data.

As shown in FIG. 2, the first stage of sense-amplifier (SA) latches (202-0, 202-90, 202-180, and 202-270) in the BBPD receives the differential input signal IN (RXP) and INB (RXN). In this case, the four SA latches (202-0, 202-90, 202-180, and 202-270) in the first stage are clocked by a four-phase clock running at half the data rate with phases 0 (CLK0), 90 (CLK90), 180 (CLK180), and 270 (CLK270) degrees, respectively. The even and odd data (Deven and Dodd, respectively) are clocked by phases 0 degrees and 180 degrees, respectively, and are output by the phase detector.

Figure 3:
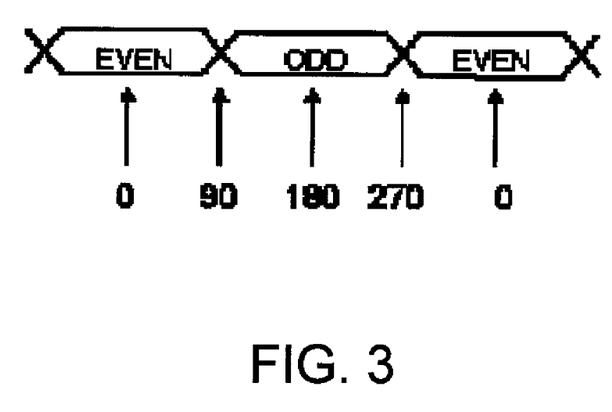
FIG. 3 is a BBPD timing diagram.

FIG. 3 is a BBPD timing diagram. As indicated in FIG. 3, even data corresponds to bit locations sampled by the phase 0 clock, and odd data corresponds to bit locations sampled by the phase 180 clock. Phase matching decisions may be made by applying combinatorial logic to samples at 0, 90, 180 and to samples at 180, 270, and 0, respectively.

Figure 4:
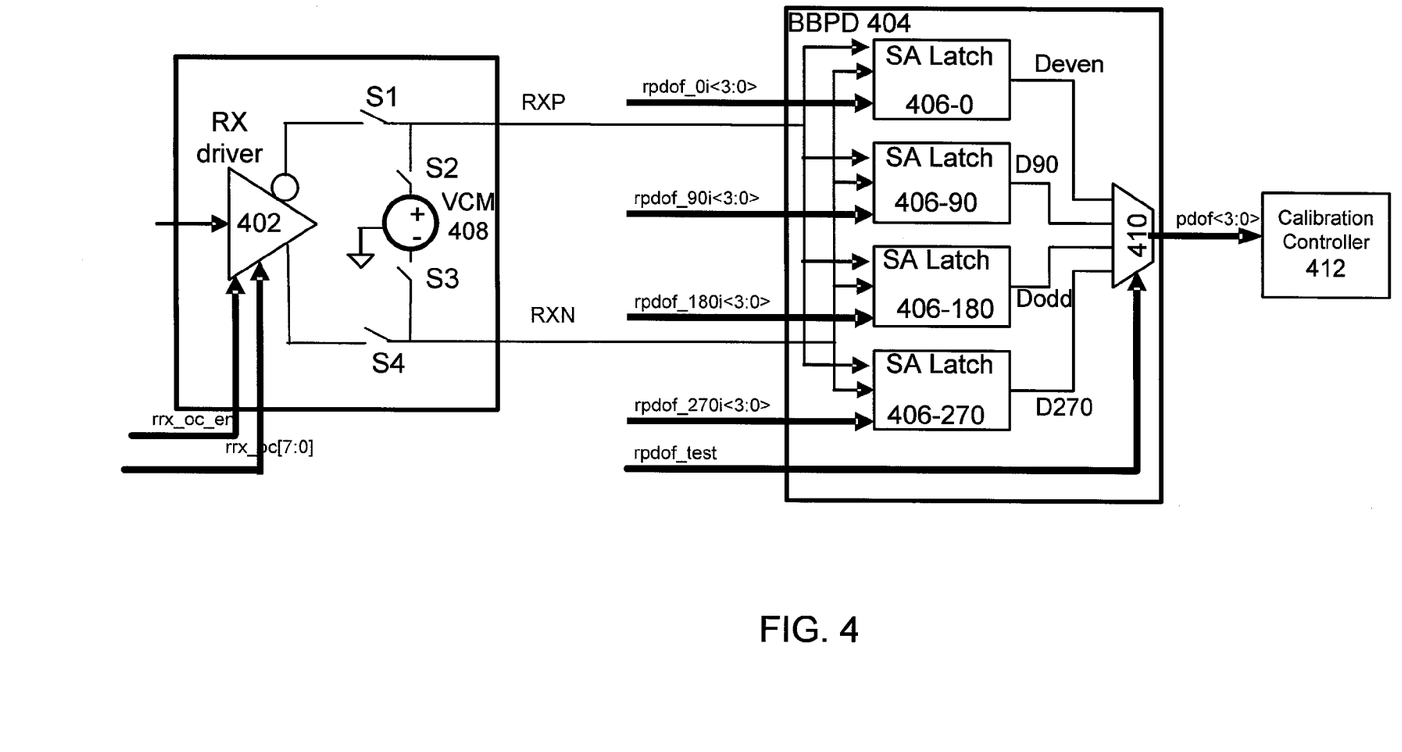
FIG. 4 is a high-level diagram showing an apparatus for receiver offset calibration in accordance with an embodiment of the invention.

FIG. 4 is a high-level diagram showing an apparatus for receiver offset calibration in accordance with an embodiment of the invention. The diagram shows a receiver input buffer (RX driver) 402 and a bang-bang phase detector 404. The four SA latches (406-0, 406-90, 406-180, and 406-270) of the first stage of the BBPD 404 are also shown. In addition, the diagram shows four switches (S1, S2, S3, and S4) and a "common mode" voltage (VCM) source 408. In one embodiment, VCM is the common mode voltage between the RXP and RXN signals when data is being input on them. The optimal bias voltage for the sense amplifiers of the SA latches may also be VCM. In one implementation, VCM may be configurable in a range around 0.6 volts. In normal operation, the input signal on RXP and RXN may vary around VCM. For example, RXP and RXN may each swing +/−50 mV around VCM to create a 100 mV single-ended signal so as to create a 200 mV differential signal.

In a normal operation mode (i.e. in user mode), S1 and S4 are closed, and S2 and S3 are open. This allows data from the RX driver 402 to reach the BBPD 404 by way of the differential signals RXN and RXP.

In a phase-detector offset-cancellation mode, S1 and S4 are open, and S2 and S3 are closed. This drives the difference of the RXP and RXN differential signals (i.e. RXP-RXN) to VCM. In this mode, offset cancellation proceeds for the four SA latches (406-0, 406-90, 406-180, and 406-270) within the BBPD 404 while they are isolated from any offset caused by the RX driver 402. At the end of the phase-detector offset-cancellation procedure, the phase-detector offsets have been cancelled.

In an RX-driver offset-cancellation mode, S1 and S4 are closed, and S2 and S3 are open. As in the user mode, this allows data from the RX driver 402 to reach the BBPD 404 by way of the differential signals RXN and RXP. In this RX-driver offset-cancellation mode, the offset of the RX driver 402 may be determined independently from the phase-detector offsets because the phase-detector offsets have been cancelled prior to this step.

Figure 5:
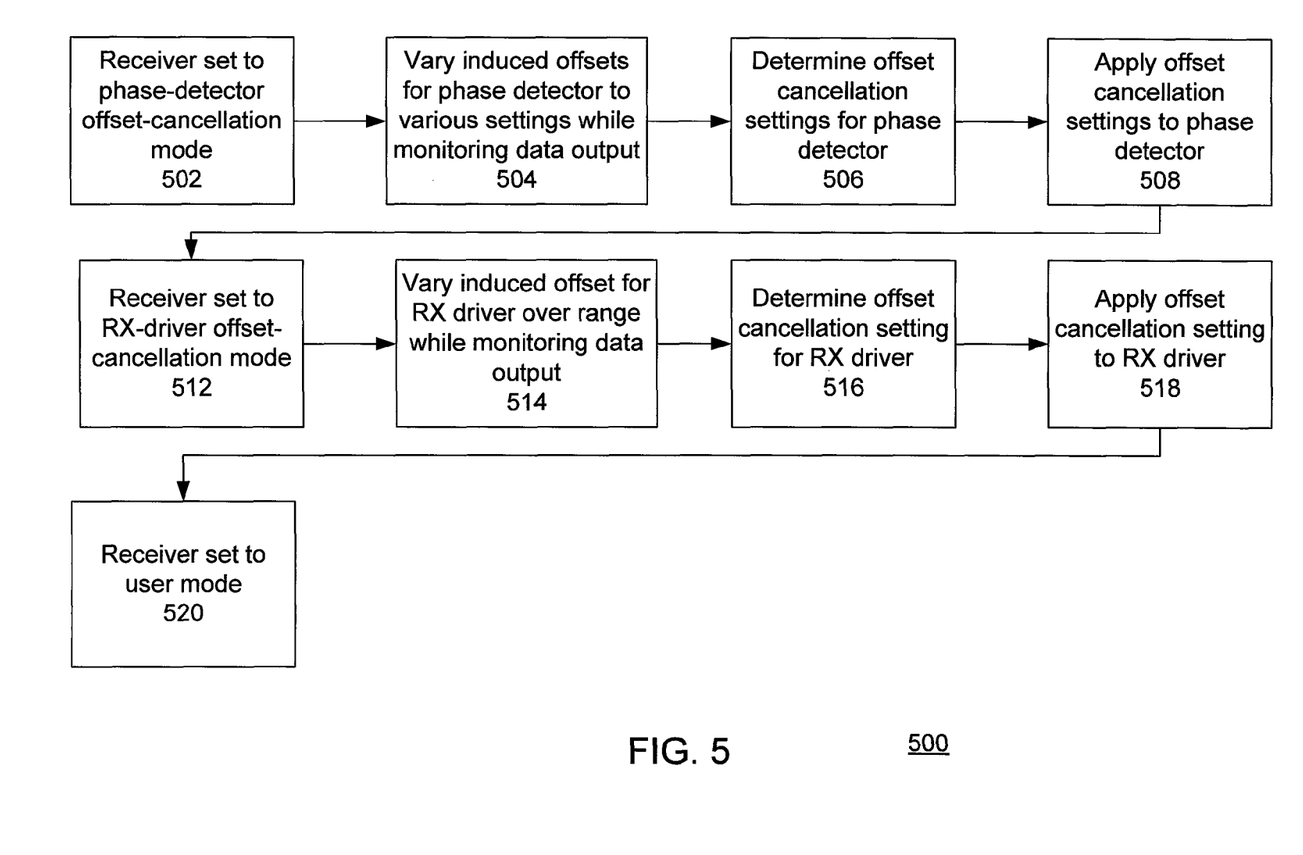
FIG. 5 is a flow chart depicting a method of receiver offset calibration in accordance with an embodiment of the invention.

FIG. 5 is a flow chart depicting a method 500 of receiver offset calibration in accordance with an embodiment of the invention. This method 500 may be performed using a circuit apparatus such as that shown in FIG. 4.

Per block 502, the receiver is set to the phase-detector offset cancellation mode. In FIG. 4, for example, switches S1 and S4 may be opened, and switches S2 and S3 may be closed. This allows the difference of the RXP and RXN differential signals (i.e. RXP-RXN) to be driven to the common mode voltage. In addition, the output from the test multiplexer 410 of the BBPD 404 to the calibration controller 412 may be enabled by setting the rpfof_test control signal.

Per block 504, the induced phase-detector offsets may be varied while their outputs are monitored. In FIG. 4, for example, the calibration controller 412 may cause the offset for each of the four SA latches (406-0, 406-90, 406-180, and 406-270) to be set independently to one of 16 voltage levels using the 4-bit induced-offset control signals rpdof_0i<3:0>, rpdof_90i<3:0>, rpdof_180i<3:0>, and rpdof_270i<3:0>, respectively, while monitoring the outputs of the four SA latches 406 by way the 4-bit test output signal pdof<3:0>, where each bit in pdof<3:0> may correspond to the data output from one of the SA latches. For example, pdof[0] may correspond to the data output Deven which is the output of the SA Latch 406-0, pdof[1] may correspond to the data output D90 which is the output of the SA Latch 406-90, pdof[2] may correspond to the data output Dodd which is the output of the SA Latch 406-180, and pdof[3] may correspond to the data output D270 which is the output of SA Latch 406-270.

Based on the induced offsets and the monitored outputs, the calibration controller 412 performs an analytical procedure to determine, per block 506, an offset cancellation setting for each of the SA latches (406-0, 406-90, 406-180, and 406-270). The analytical procedure may be similar to that disclosed in S. Maangat, et al., "Receiver Offset Cancellation in 90-nm PLD Integrated SERDES," November 2007 (hereinafter, the Maangat paper), the disclosure of which is hereby incorporated by reference. As disclosed in the Maangat paper, boundaries of an unstable state region of the phase detector may be discovered in order to determine the offset cancellation settings for the phase detector.

However, unlike the Maangat paper, the data path from the BBPD 404 to the calibration controller 412 does not go through the SIPO 108. Hence, all four SA latches may be included in the calibration process, and an individual offset cancellation setting may be determined for each of the SA latches.

In block 508, the offset cancellation settings determined per block 506 are applied to the phase detector. In FIG. 4, for example, this may be accomplished by setting the 4-bit induced-offset control signals rpdof_0i<3:0>, rpdof_90i<3:0>, rpdof_180i<3:0>, and rpdof_270i<3:0> to the values determined in block 506. Applying the offset cancellation settings to the phase detector completes the first stage of the offset cancellation method 500.

Next, per block 512, the receiver is set to the RX-driver offset-cancellation mode. In FIG. 4, for example, switches S1 and S4 may be closed, and switches S2 and S3 may be opened. This allows data from the RX driver 402 to reach the BBPD 404 by way of the differential signals RXP and RXN. In addition, the output from the test multiplexer 410 of the BBPD 404 to the calibration controller 412 may be enabled by setting the rpfof_test control signal.

Per block 514, an induced RX-driver offset may be varied over a range of voltages while the data outputs of the phase detector are monitored. In FIG. 4, for example, the calibration controller 412 may cause the offset for the RX driver 402 to be stepped over 256 voltage levels using the 8-bit control signal rrx_oc<7:0>, while monitoring the data outputs by way the 4-bit output signal pdof<3:0>. In accordance with one embodiment, the calibration controller 412 may monitor the data outputs Deven and Dodd and use a logic circuit to determine whether those data outputs indicate a "Stable 0" (stable low) state, an "Unknown" state, or a "Stable 1" (stable high)

state. The following state table indicates the logic that is used by the controller 412 in this embodiment.

| Deven | Dodd | State of the Data Signal |
|-------|------|--------------------------|
| 0 | 0 | Stable 0 |
| 0 | 1 | Unknown |
| 1 | 0 | Unknown |
| 1 | 1 | Stable 1 |

The Stable 0 state corresponds to an offset which is at a sufficiently negative voltage such that both Deven and Dodd give a logical zero. The Stable 1 state corresponds to an offset which is at a sufficiently positive voltage such that both Deven and Dodd give a logical one. Other combinations of Deven and Dodd result in the Unknown state.

Figure 6:
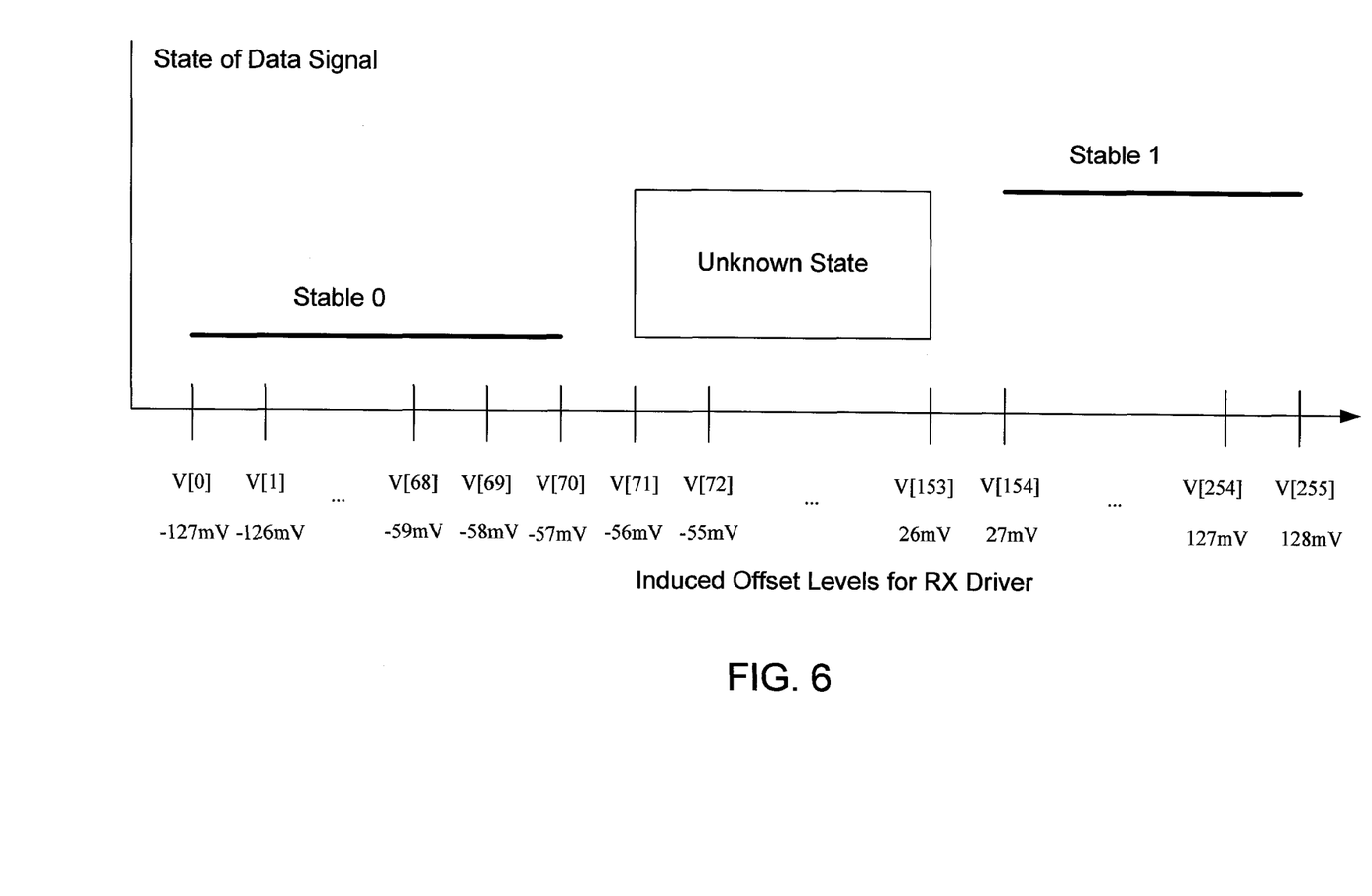
FIG. 6 shows an example of how the state of the data signal may vary as the induced offset for the RX driver is stepped over a range of voltages.

Per block 516, a determination may then be made of the offset cancellation setting for the RX driver. In accordance with the embodiment where Deven and Dodd are monitored over a range of RX-driver offset voltages, the offset cancellation setting for the RX driver 402 may be determined to be the offset voltage closest to the center of the range of offset voltages which result in the Unknown state. In other words, an optimum offset may be determined to be the RX-driver offset voltage in the middle of the "unknown" region. An example of how the state of the data signal may vary as the induced offsets for the RX driver 402 are stepped over a range of voltages is shown in FIG. 6. In this example, the induced offsets are stepped over the 256 voltage levels V[0], V[1], V[2], . . . , V[253], V[254], and V[255]. In one particular instance, for purposes of illustration, V[0] may correspond to −127 mV, V[255] may be +128 mV, and each step in between may be separated by 1 mV (one millivolt). By monitoring Deven and Dodd, the state of the data signal may be determined in accordance with the above state table. In this instance, the state of the data signal may be: Stable 0 for induced offset voltage levels V[0] through V[70] (i.e. from −127 mV to −57 mV); Unknown State for induced offset voltage levels V[71] through V[153] (e.g., from −56 mV to +26 mV); and Stable 1 for induced offset voltage levels V[154] through V[255] (i.e. from +27 mV to +128 mV). In this case, the induced offset voltage level in the middle of the unknown region is V[112] which corresponds to −15 mV, so the offset cancellation setting would be −15 mV.

In block 518, the offset cancellation setting determined per block 516 is applied to the RX driver 402. This may be accomplished by setting the 8-bit control signals rrx_oc<7:0>. In the example discussed above in relation to FIG. 6, the 8-bit control signal may be set to induce an offset voltage of −15 mV at the RX driver 402. Applying the offset cancellation setting to the RX driver completes the second stage of the offset cancellation method 500.

Next, per block 520, the receiver is set to the user mode. In FIG. 4, for example, switches S1 and S4 may be closed, and switches S2 and S3 may be open. This allows data from the receiver circuit 402 to reach the BBPD 404 by way of the differential signals RXP and RXN. In addition, the output 410 from the BBPD 404 to the calibration controller 412 may be disabled by clearing the rpfof_test control signal.

Figure 7:
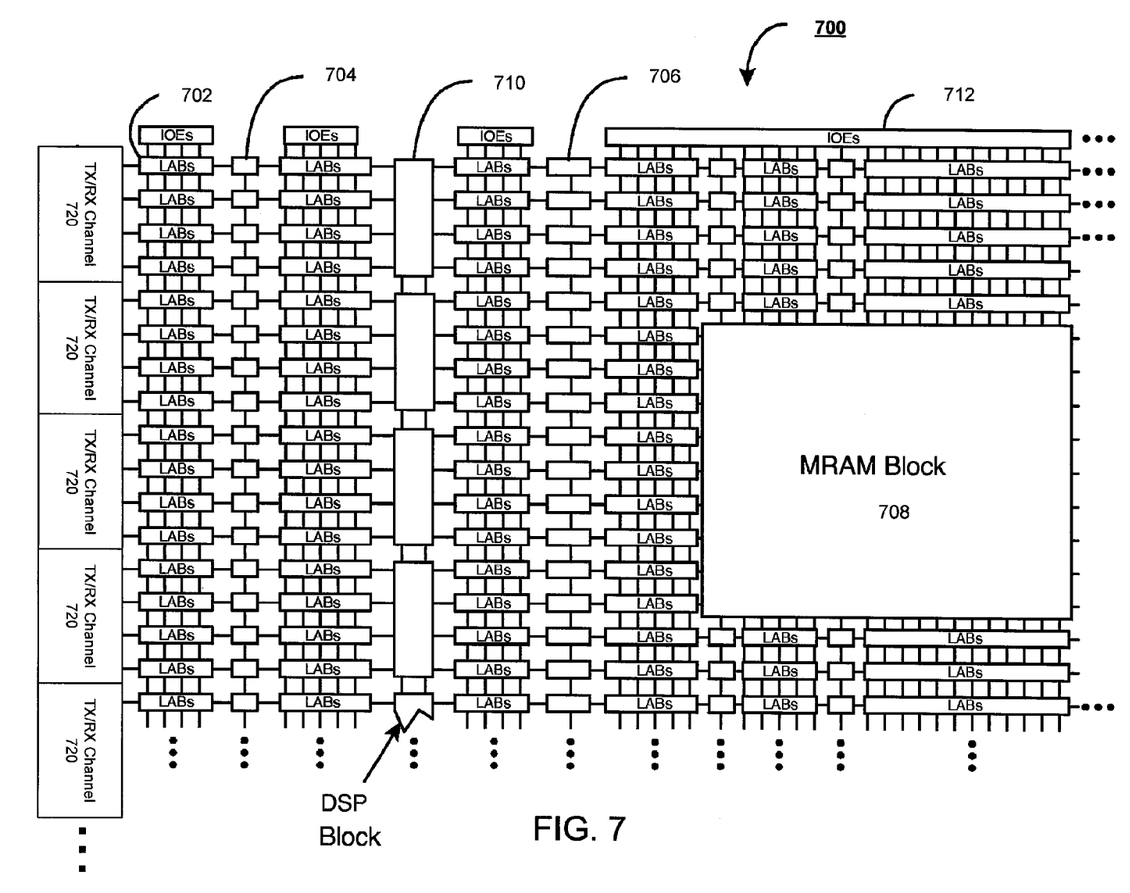
FIG. 7 is a simplified partial block diagram of a field programmable gate array (FPGA) that may be configured to implement an embodiment of the present invention.

FIG. 7 is a simplified partial block diagram of a field programmable gate array (FPGA) 700 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 700 includes within its "core" a two-dimensional array of programmable logic array blocks (or LABs) 702 that are interconnected by a network of column and row interconnect conductors of varying length and speed. LABs 702 include multiple (e.g., 10) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 700 may also include a distributed memory structure including random access memory (RAM) blocks of varying sizes provided throughout the array. The RAM blocks include, for example, blocks 704, blocks 706, and block 708. These memory blocks can also include shift registers and FIFO buffers.

FPGA 700 may further include digital signal processing (DSP) blocks 710 that can implement, for example, multipliers with add or subtract features. Input/output elements (IOEs) 712 located, in this example, around the periphery of the chip support numerous single-ended and differential input/output standards. Each IOE 712 is coupled to an external terminal (i.e., a pin) of FPGA 700. A transceiver (TX/RX) channel array may be arranged as shown, for example, with each TX/RX channel circuit 720 being coupled to several LABs.

A TX/RX channel circuit 720 may include, among other circuitry, the receiver circuitry described herein. A subset of the LABs 702 coupled to the TX/RX channel circuits 720 may be configured to implement the calibration controller 412 described above in relation to FIG. 4.

It is to be understood that FPGA 700 is described herein for illustrative purposes only and that the present invention can be implemented in many different types of PLDs, FPGAs, and ASICs.

Figure 8:
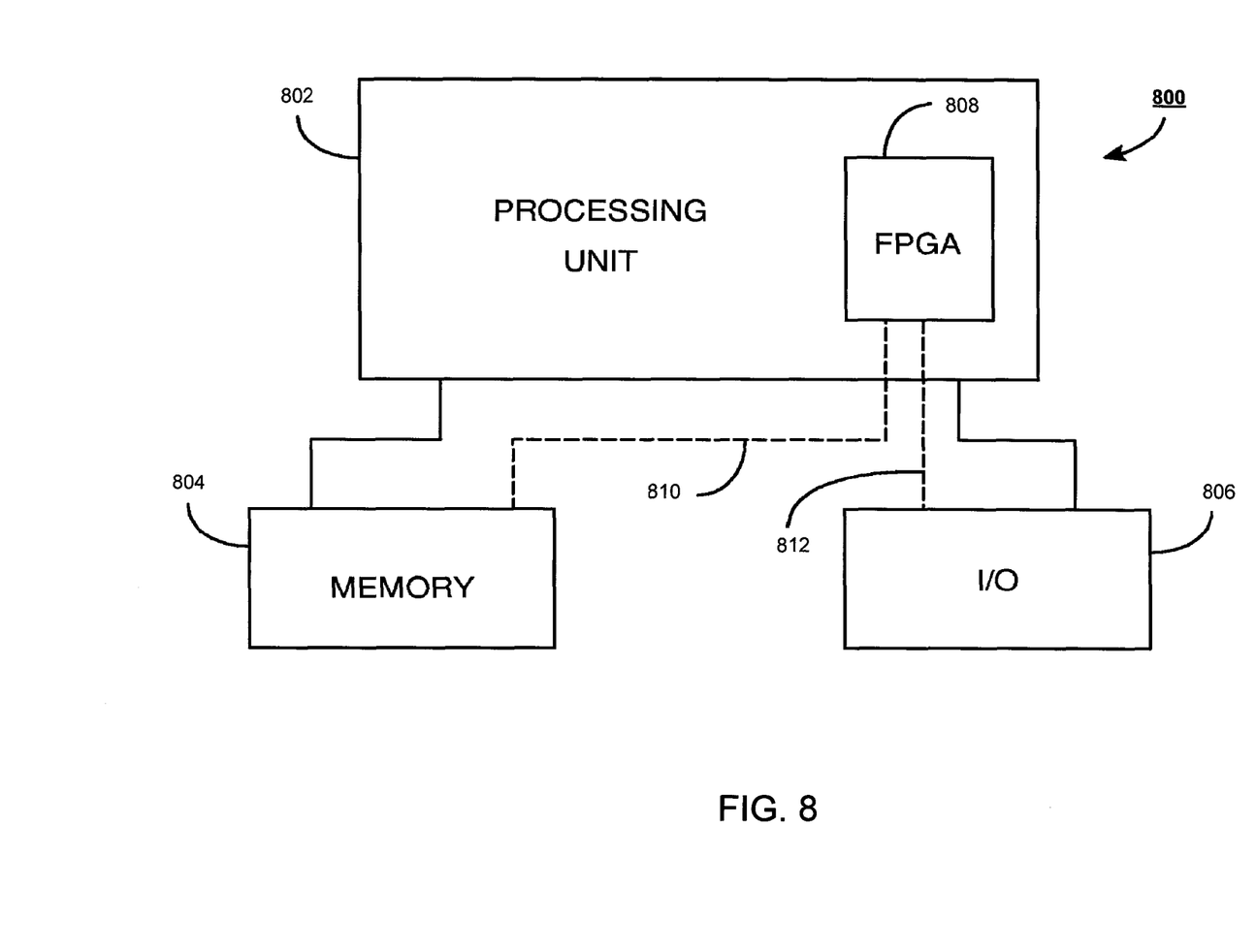
FIG. 8 shows a block diagram of an exemplary digital system that may be configured to utilize an embodiment of the present invention.

The present invention can also be implemented in a system that has a FPGA as one of several components. FIG. 8 shows a block diagram of an exemplary digital system 800 that can embody techniques of the present invention. System 800 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 800 may be provided on a single board, on multiple boards, or within multiple enclosures.

System 800 includes a processing unit 802, a memory unit 804, and an input/output (I/O) unit 806 interconnected together by one or more buses. According to this exemplary embodiment, FPGA 808 is embedded in processing unit 802. FPGA 808 can serve many different purposes within the system 800. FPGA 808 can, for example, be a logical building block of processing unit 802, supporting its internal and external operations. FPGA 808 is programmed to implement the logical functions necessary to carry on its particular role in system operation. FPGA 808 can be specially coupled to memory 804 through connection 810 and to I/O unit 806 through connection 812.

Processing unit 802 may direct data to an appropriate system component for processing or storage, execute a program stored in memory 804, receive and transmit data via I/O unit 806, or other similar function. Processing unit 802 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 808 may control the logical operations of the system. As another example, FPGA 808 acts as a reconfigurable processor that may be reprogrammed as needed to handle a particular computing task. Alternately, FPGA 808 may itself include an embedded microprocessor. Memory unit 804 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of offset cancellation for a receiver in an integrated circuit, the method comprising:
    setting the receiver to a phase-detector offset-cancellation mode;
    varying induced offsets for a phase detector while monitoring data output;
    determining offset cancellation settings for the phase detector from the induced offsets and the data output;
    applying the offset cancellation settings to the phase detector;
    setting the receiver to a receiver-driver offset-cancellation mode;
    varying an induced offset for a receiver driver while monitoring the data output;
    determining an offset cancellation setting for the receiver driver from the induced offset and the data output; and
    applying the offset cancellation setting to the receiver driver.

2. The method of claim 1, further comprising, in the phase-detector offset-cancellation mode, electrically isolating an output of the receiver driver from an input of the phase detector.

3. The method of claim 2, wherein said electrically isolating is performed by opening a first pair of switches and closing a second pair of switches.

4. The method of claim 2, wherein the input of the phase detector is driven to a predetermined voltage level in the phase-detector offset-cancellation mode.

5. The method of claim 2, further comprising, in the receiver-driver offset-cancellation mode, electrically connecting the output of the receiver driver to the input of the phase detector.

6. The method of claim 5, wherein said electrically isolating is performed by opening a first pair of switches and closing a second pair of switches, and wherein said electrically connecting is performed by closing the first pair of switches and opening the second pair of switches.

7. The method of claim 5, wherein the input of the phase detector is driven to a predetermined voltage level in the phase-detector offset-cancellation mode, and wherein the input of the phase detector is driven by the receiver driver output in the receiver-driver offset-cancellation mode.

8. The method of claim 1, further comprising, in the phase-detector offset-cancellation mode, discovering boundaries of an unstable state region of the phase detector in order to determine the offset cancellation settings for the phase detector.

9. The method of claim 1, further comprising, in the receiver-driver offset-cancellation mode, determining a range of induced offsets that result in the data output being in an unknown state, and using an induced offset at a middle of the range as the offset cancellation setting for the receiver driver.

10. An integrated circuit configured to perform receiver offset cancellation, the integrated circuit comprising:
    a receiver driver configured to receive a differential input signal;
    a phase detector including a plurality of latches;
    a calibration controller configured to receive outputs from the latches and to send control signals to the receiver driver and the phase detector;
    a voltage source;
    a first pair of switches coupling an output of the receiver driver to an input of the phase detector; and
    a second pair of switches coupling the voltage source to the input of the phase detector.

11. The integrated circuit of claim 10, wherein the calibration controller is configured to set the receiver to a phase-detector offset-calibration mode in which the first pair of switches are open and the second pair of switches are closed.

12. The integrated circuit of claim 11, wherein the calibration controller is further configured, in the phase-detector offset-calibration mode, to vary induced offsets for the plurality of latches in the phase detector while monitoring the outputs from the latches in the phase-detector offset-calibration mode and to determine offset cancellation settings for the phase detector from the outputs.

13. The integrated circuit of claim 12, wherein the calibration controller is further configured to set the receiver to a receiver-driver offset-calibration mode in which the offset cancellation settings for the phase detector are applied, the first pair of switches are closed, and the second pair of switches are open.

14. The integrated circuit of claim 13, wherein the calibration controller is further configured, in the receiver-driver calibration mode, to vary an induced offset for the receiver driver while monitoring the outputs from the latches and to determine an offset cancellation setting for the receiver driver from the outputs.

15. The integrated circuit of claim 14, wherein the calibration controller is further configured to set the receiver to a user mode in which the offset cancellation settings for the phase detector are applied to the phase detector, the offset cancellation setting for the receiver is applied to the receiver, the first pair of switches are closed, and the second pair of switches are open.

16. The integrated circuit of claim 10, wherein the phase detector comprises a bang-bang phase detector, and wherein the bang-bang phase detector comprises a first latch which samples the output of the driver at zero degrees, a second latch which samples the output of the driver at ninety degrees, a third latch which samples the output of the driver at one hundred eighty degrees, and a fourth latch which samples the output of the driver at two hundred seventy degrees.

17. An offset calibration circuit comprising:
a receiver driver;
bang-bang phase detector;
a calibration controller configured to receive outputs from the bang-bang phase detector and to send control signals to the receiver driver and the bang-bang phase detector;
a first pair of switches coupling an output of the receiver driver to an input of the bang-bang phase detector; and
a second pair of switches coupling a voltage source to the input of the bang-bang phase detector.

18. The offset calibration circuit of claim 17, wherein the calibration controller is configured to open the first pair of switches and close the second pair of switches prior to calibrating voltage offsets for the bang-bang phase detector so as to isolate the bang-bang phase detector from the receiver driver.

19. The offset calibration circuit of claim 18, wherein the calibration controller is configured to close the first pair of switches and open the second pair of switches prior to calibrating a voltage offset for the receiver driver so as to connect the receiver driver to the bang-bang phase detector.

20. The offset calibration circuit of claim 19, wherein offset cancellation voltages are applied to the bang-bang phase detector during calibration of the voltage offset for the receiver driver.

* * * * *